W. G. JOHNSON.
MOTOR CYCLE TRANSMISSION MECHANISM.
APPLICATION FILED NOV. 8, 1915.

1,218,667.

Patented Mar. 13, 1917.

Inventor
Wilfred G. Johnson
by Thurston & Kwis
Attys.

UNITED STATES PATENT OFFICE.

WILFRED G. JOHNSON, OF ELYRIA, OHIO, ASSIGNOR TO THE CLEVELAND MOTORCYCLE MANUFACTURING COMPANY, OF CLEVELAND, OHIO.

MOTOR-CYCLE TRANSMISSION MECHANISM.

1,218,667. Specification of Letters Patent. Patented Mar. 13, 1917.

Application filed November 8, 1915. Serial No. 60,231.

*To all whom it may concern:*

Be it known that I, WILFRED G. JOHNSON, a citizen of the United States, residing at Elyria, in the county of Lorain and State of Ohio, have invented a certain new and useful Improvement in Motor-Cycle Transmission Mechanism, of which the following is a full, clear, and exact description.

This invention relates to motorcycles and covers certain modifications of the construction shown in my Patent No. 1,157,547 granted the 19th day of October, 1915, for "motor-cycles."

In my patent above referred to I have shown and claimed a motorcycle having a power plant and transmission which includes an engine with a hollow rearwardly extending transmission shaft connected through worm gearing to a transverse sprocket shaft and adapted to be driven at a plurality of speeds by speed change gearing located between the engine and the worm gearing. Extending through this shaft is a magneto shaft which at its forward end is connected to the fly wheel of the engine and at its rear end is coupled to a magneto supported on the frame or casing of the power plant, this magneto being driven at a fixed speed relative to the speed of the engine, although the hollow shaft through which the magneto shaft extends is driven at a plurality of speeds, as above stated.

In the present case I provide a transmission shaft which is arranged as shown in my patent, but which is driven at all times at the speed of the engine, and I provide at the transverse sprocket shaft which is preferably above the transmission shaft, multispeed gearing so that said transverse shaft can be driven at a plurality of speeds relative to the engine and to the main transmission shaft. Instead of utilizing a separate drive shaft connected to the magneto I am with this construction able to couple the magneto direct to the transmission shaft.

The invention may be further briefly summarized as consisting in certain novel details of construction and combinations and arrangements of parts which will be described in the specification and set forth in the appended claims.

Figure 1:
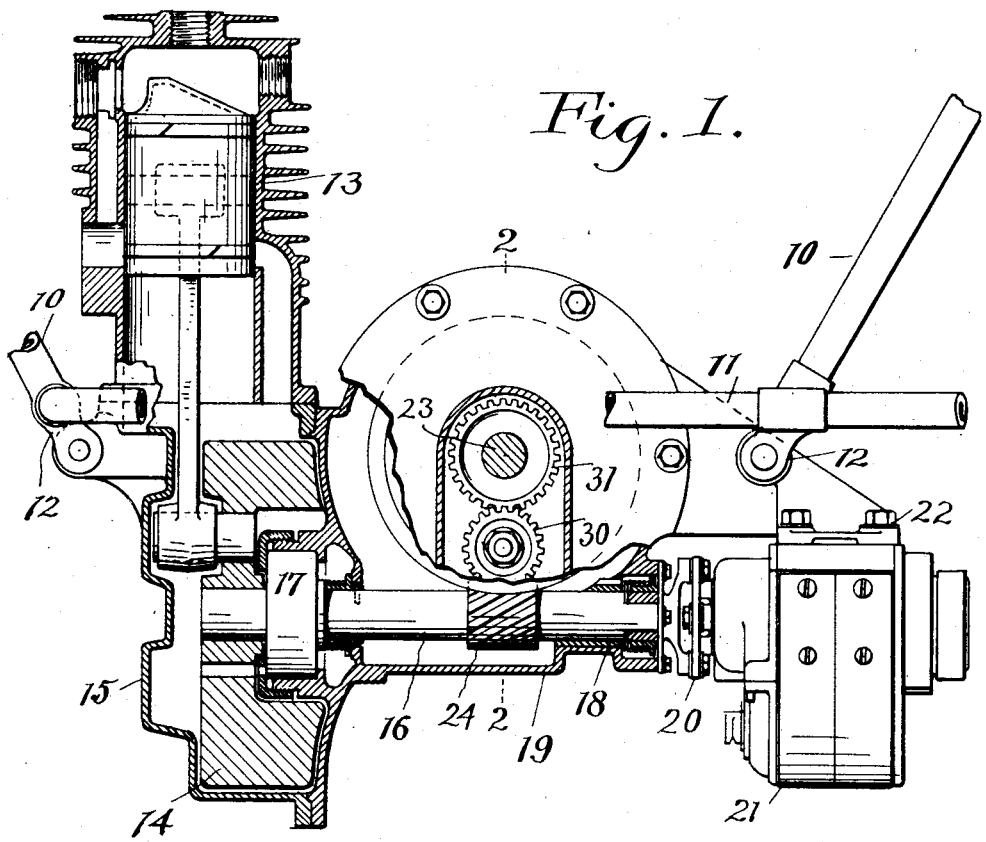
Figure 2:
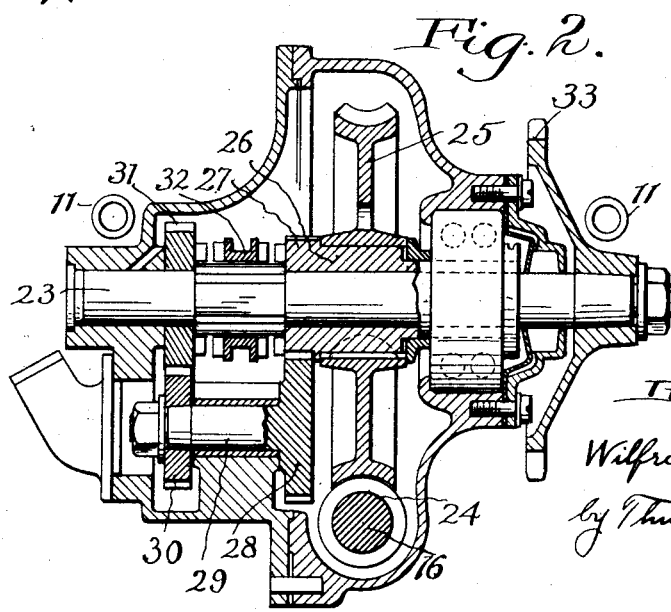

In the accompanying sheet of drawings wherein I have shown the preferred embodiment of the present invention, Figure 1 is a view partly in section and partly in elevation, showing a portion of the motorcycle frame and the major portion of the unit power plant or power, transmission and magneto plant; Fig. 2 is a transverse section taken substantially along the line 2—2 of Fig. 1. The frame of the motorcycle may be, and preferably is, of precisely the construction of that shown in my prior patent and includes in addition to the upper frame member (not shown) the downwardly extending frame members 10 and the horizontal frame members 11 connected to the members 10 near the lower ends of the latter. At the lower ends of the members 10 are hangers 12 to which the power plant is attached, these hangers constituting a two-point suspension for the unit power plant with the points of suspension not only at the lower ends of the inclined frame members 10 but near the plane of the lower frame members 11. The advantages of this arrangement are set forth in my patent and need not be further referred to herein.

The so-called unit power plant includes an engine 13 which is preferably a single cylinder two-cycle engine having a fly-wheel 14 which rotates in a plane at right angles to the plane of the frame, said fly-wheel being inclosed in a fly-wheel casing 15 secured to the cylinder casting.

Secured in the center of the fly-wheel is a rearwardly extending transmission shaft 16, the forward end of which is supported by a ball and ring bearing 17 mounted in an inset or flanged part of the fly-wheel casing 15 and the rear end being supported in a bearing 18 mounted in the rear portion of the transmission housing 19, the said transmission housing being secured to and forming a rearward continuation of the fly-wheel housing or casing 15. It will be seen that this shaft 16 at all times rotates at the speed of the engine. The shaft 16 is coupled by a coupling 20 to a magneto 21, which is also driven constantly at the speed of the engine and is supported at 22 at the rear end of the transmission housing 19.

Located above and transversely of the shaft 16 and about midway between the magneto and engine is a transverse sprocket shaft 23 which is mounted in the upper part of the transmission casing 19. This shaft 23, instead of being driven at all times at a fixed or definite speed relative to the speed of the rearwardly extending transmission shaft 16, as in my prior patent, is adapted to be driven at a plurality of speeds relative thereto. The driving gearing includes a worm 24 which is secured to or formed on the main rearwardly extending transmission shaft 16 and a worm wheel 25 keyed to a sleeve or hub-like member 26 on the transverse sprocket shaft 23 (see Fig. 2). This sleeve 26 has formed on one end a gear 27 which meshes with a gear 28 on a lower counter-shaft 29 having a second gear 30 which meshes with a gear 31 also mounted on the transverse sprocket shaft 23. Between the gears 27 and 31 there is a shiftable clutch member 32 which is splined to the shaft and is adapted to be moved by any suitable mechanism not here shown in one direction to clutch the gear 27 to the shaft 23 and to be moved in the reverse direction to clutch the gear 31 to the shaft 23.

It will be observed that when the clutch member 32 is in neutral position the motorcycle is stationary, the shaft 16, worm 24, worm wheel 25, and gears 27, 28, 30 and 31 running idle. If the clutch member is shifted to the right, as viewed in Fig. 2, the sleeve 26 to which the worm wheel 25 is keyed is then clutched to the shaft 23 and this shaft 23 will be driven at maximum speed relative to the speed of the engine and of the transmission shaft 16. If, on the other hand, the clutch member is shifted to the left so as to clutch the gear 31 to the shaft 23, the shaft 23 is driven at a less speed through the reduction gearing including the gears 27, 28, 30 and 31.

To one end of this transverse shaft 23 there is secured a driving sprocket wheel 33 or an equivalent driving wheel which will be connected preferably by a chain to a similar wheel, (not shown) attached to the axle of the rear wheel of the motor-cycle.

It will be seen that this construction is exceedingly simple and that I am enabled to secure a multi-speed drive employing a transmission shaft utilized for driving the motorcycle and as a driving agency for the magneto which is thereby driven at the speed of the engine as is required with an engine of the two-cycle type.

Having thus described my invention, what I claim is:—

1. In a motorcycle, a motorcycle frame, an engine supported thereby, a magneto, a transmission shaft, a second shaft, said transmission shaft being connected at its ends to said engine and magneto respectively, and between its ends being connected to the second shaft so as to drive the same.

2. In a motorcycle, a frame, a power plant and transmission means supported thereby and including an engine having a fly-wheel adapted to rotate in a plane at right angles to the plane of the frame, a rearwardly extending transmission shaft secured to the fly-wheel and driven at a fixed speed relative thereto, a transverse sprocket shaft, and multi-speed gearing for transmitting power from said transmission shaft to the transverse shaft and for driving the latter at a plurality of speeds relative to the former.

3. In combination in a motorcycle, a frame, a power and transmission means supported thereby and including an engine, a transverse sprocket shaft, a rearwardly extending transmission shaft connected to the engine and gearing for causing said transmission shaft to drive said transverse shaft at a plurality of speeds relative to the transmission shaft including a worm on a transmission shaft, a worm wheel surrounding the transverse shaft adapted to be clutched to and unclutched from said transverse shaft.

4. In combination in a motorcycle, a frame, a power and transmission means supported thereby and including an engine, a rearwardly extending transmission shaft driven by the engine at a fixed speed relative thereto, a transverse sprocket shaft and gearing for driving said transverse shaft at a plurality of speeds relative to the transmission shaft including a worm on the transmission shaft, a worm wheel surrounding the transverse shaft, and means whereby said transverse shaft may be driven at the same or at a different speed relative to said worm wheel.

5. In combination in a motorcycle, a frame, a power and transmission means supported thereby and including an engine, a rearwardly extending transmission shaft driven by the engine at a fixed speed relative thereto, a transverse shaft and gearing for driving said transverse shaft at a plurality of speeds relative to the transmission shaft and including a worm on the transmission shaft, a worm wheel surrounding the transverse shaft, multi-speed gears associated with said transverse shaft and a clutch member splined to said transverse shaft and adapted when in one operative position to cause said transverse shaft to be driven at the speed of the worm wheel and when in another operative position to cause the transverse shaft to be driven at less speed than the worm gear.

6. In a motorcycle, a motorcycle frame, a power plant and transmission means supported thereby and including an engine of the single cylinder two cycle type, a transmission shaft directly connected to and driven at the speed of the engine, and a magneto directly connected to said shaft so as to be driven also at the speed of the engine.

7. In a motorcycle, a motorcycle frame, a power plant and transmission means supported thereby and including an engine having a fly-wheel adapted to rotate in a plane at right angles to the plane of the frame, a transmission shaft extending rearwardly from the fly-wheel and driven thereby, a sprocket shaft at right angles to the frame, a magneto coupled to the rear end of the transmission shaft, and gearing for transmitting power from said transmission shaft to said sprocket shaft and including a gear located between the engine and the magneto.

8. In a motorcycle, a motorcycle frame, a power plant and transmission means carried thereby and including an engine, a transmission shaft, a second shaft at right angles thereto, gearing for transmitting power from said first named shaft to said second shaft and including a gear on said first named shaft between the ends of the latter, and a magneto connected to the end of the first named shaft.

9. In a motorcycle, a motorcycle frame, an engine, a shaft extending rearwardly from the engine and adapted to be driven thereby, a second shaft at right angles to the first named shaft, gearing including a worm gear on said first named shaft between the ends of the latter for transmitting movement from said first named shaft to the second named shaft, and a magneto connected to the end of said first named shaft.

10. In a motor-cycle, a frame, a unit power plant supported thereby and including an engine of the two-cycle type having a fly-wheel adapted to rotate at right angles to the plane of the frame, a transmission shaft fixed to and extending rearwardly from the fly-wheel, a transverse sprocket shaft above the transmission shaft, gearing for transmitting power from the transmission shaft to the sprocket shaft and including a gear on said transmission shaft between the ends of the latter, and a gear surrounding said sprocket shaft, and a magneto coupled to the rear end of said transmission shaft.

In testimony whereof, I hereunto affix my signature.

WILFRED G. JOHNSON.

Copies of this patent may be obtained for five cents each, by addressing the "Commissioner of Patents, Washington, D. C."